United States Patent [19]

Hill et al.

[11] 4,360,208

[45] Nov. 23, 1982

[54] SEGMENTED ANNULAR LIP SEAL

[75] Inventors: Alfred Hill, Abbots Langley; Robert G. Baker, Woking, both of England

[73] Assignee: The Glacier Metal Company Limited, Middlesex, England

[21] Appl. No.: 178,461

[22] PCT Filed: Apr. 17, 1979

[86] PCT No.: PCT/GB79/00061

§ 371 Date: Dec. 17, 1979

§ 102(e) Date: Dec. 17, 1979

[87] PCT Pub. No.: WO79/00943

PCT Pub. Date: Nov. 15, 1979

[30] Foreign Application Priority Data

Apr. 18, 1978 [GB] United Kingdom ............... 15223/78

[51] Int. Cl.³ ............................................. F16J 15/32
[52] U.S. Cl. ..................................... 277/153; 277/49; 277/166; 277/154; 277/186; 277/199
[58] Field of Search ............................. 277/36, 47–49, 277/152, 139, 140, 142, 153, 164, 166, 154, 155, 165, 167.3, 186, 189, 199

[56] References Cited

U.S. PATENT DOCUMENTS

| 2,466,533 | 4/1949 | Chambers | 277/49 |
| 2,482,029 | 9/1949 | Reynolds | 277/152 |
| 2,698,194 | 12/1954 | Becker | 277/153 |
| 2,957,717 | 10/1960 | Bram | 277/164 X |
| 3,120,960 | 2/1964 | Pippert et al. | 277/230 |
| 3,554,567 | 1/1971 | Carroll et al. | 277/164 |
| 3,637,222 | 1/1972 | Wilkinson | 277/152 X |

FOREIGN PATENT DOCUMENTS

| 832368 | 2/1952 | Fed. Rep. of Germany | 277/153 |
| 834627 | 3/1952 | Fed. Rep. of Germany | 277/153 |
| 864344 | 1/1953 | Fed. Rep. of Germany . | |
| 1283534 | 2/1969 | Fed. Rep. of Germany . | |
| 1169444 | 9/1958 | France | 277/164 |
| 2122222 | 8/1972 | France . | |
| 2313625 | 12/1976 | France | 277/164 |
| 674616 | 6/1952 | United Kingdom | 277/199 |
| 919370 | 2/1963 | United Kingdom | 277/153 |
| 936741 | 9/1963 | United Kingdom . | |
| 1237881 | 6/1971 | United Kingdom | 277/164 |
| 1478273 | 6/1977 | United Kingdom . | |

Primary Examiner—Robert S. Ward, Jr.
Attorney, Agent, or Firm—Oblon, Fisher, Spivak, McClelland & Maier

[57] ABSTRACT

An annular seal against the flow of fluid along a shaft sleeve (5) includes a rigid ring (15) with flexible flanges (10,11) respectively radially inwards and outwards of the ring (15), one of which carries a sealing contact lip (9) against the shaft sleeve (5) while the other is connected to a surrounding mounting (13).

15 Claims, 9 Drawing Figures

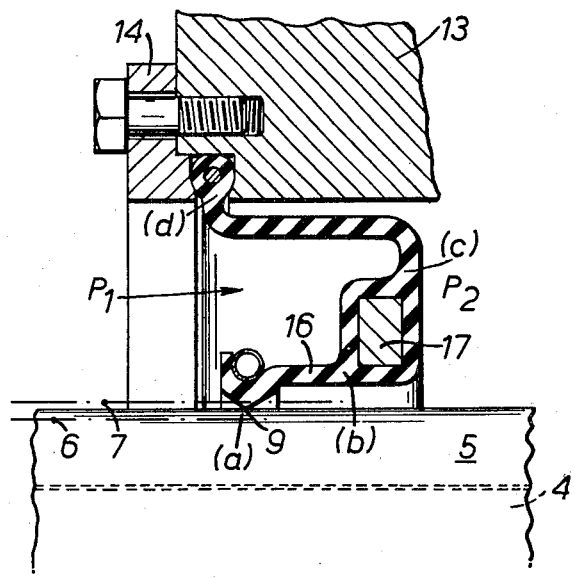
FIG. 4.
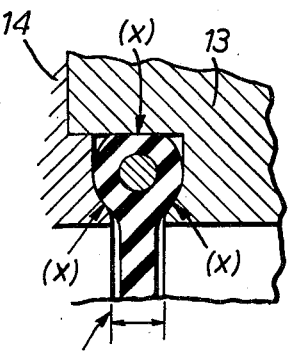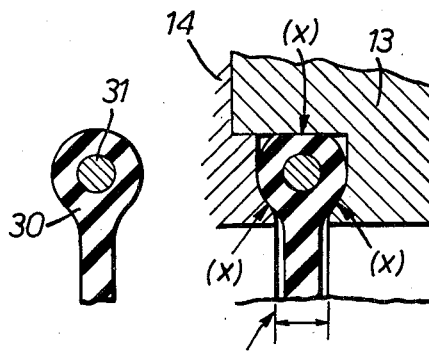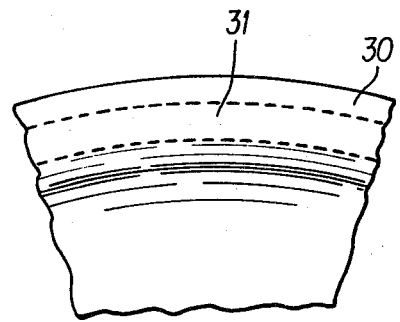
FIG.5a  FIG.5b  FIG.5c
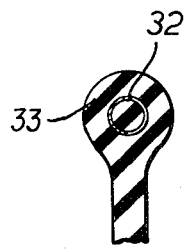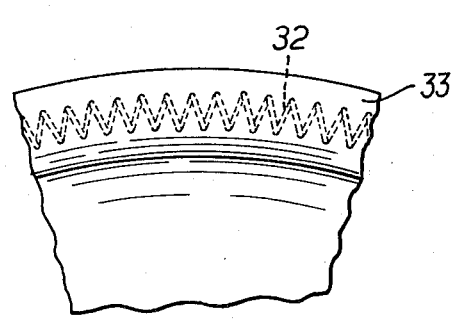
FIG.6a  FIG.6b

SEGMENTED ANNULAR LIP SEAL

BACKGROUND OF THE INVENTION

1. Field of the Invention

This invention relates to annular seals against the flow of fluid along a shaft, for example for a marine propeller shaft where it is necessary to provide seals against the entry of sea water, and against the escape of lubricating oil from a bearing housing in either direction along the shaft.

2. Description of the Prior Art

British Pat. No. 1478273 (Howaldtwerke) teaches an annular seal in the form of an elastomeric member but such a seal has been capable of sufficient deformation due to pressure differences across it to displace it from its correct sealing position, and to cause it to rub on the shaft causing losses.

SUMMARY OF THE INVENTION

According to the present invention, an annular seal against the flow of fluid along a shaft which is rotatable in a surrounding mounting includes a relatively rigid ring and relatively flexible flanges or sleeves which are respectively radially inwards and outwards of the ring, one of which flanges is connected to the shaft or mounting, while the other carries a sealing contact lip against the mounting or the shaft; the flanges having radial clearance with the shaft and mounting to be capable of deformation to permit variation of the radial clearance between the shaft and the mounting during rotation of the shaft without losing the seal.

In accordance with the present invention, the relatively rigid ring will be substantially undeformed in use, and that ring can conveniently be located in one axial direction against a support on the mounting, so that the inner and outer flanges tend not to distort sufficiently to impair the efficiency of the seal. One problem with such a shaft seal is to accommodate what is effectively non-concentricity of the shaft about its axis of rotation, possibly due to whirling load or to static loads, but with the present invention the flexible flanges can accommodate such non-concentricity and maintain the seal.

Conveniently, one or each of the radially inner and outer flanges extends from the relatively rigid ring in a direction having a substantial component parallel with the axis of the shaft, so that radial flexing is possible against little resistance even though axial location is provided between the relatively rigid ring and the support on the mounting.

According to another aspect of the present invention, an annular seal has a flexible flange with a reinforced bead at its radially inner or outer edge, which bead is engaged in an annular groove in a mounting, the groove having a neck for the flange which neck is about the same width as the reinforcement within the bead to prevent removal of the bead from the groove.

The bead is conveniently moulded around the reinforcement which may be a circumferentially extending metal or plastics wire, or a circumferentially extending metal or plastics helical coil.

The groove may be defined between two mounting components one of which is assembled with the other, after the reinforced bead has been located, and then conveniently the groove has three surfaces pressing on the bead which surfaces are distributed around the reinforcement.

BRIEF DESCRIPTION OF THE DRAWINGS

Various other objects, features and attendant advantages of the present invention will be more fully appreciated as the same becomes better understood from the following detailed description when considered in connection with the accopanying drawings in which like reference characters designate like or corresponding parts throughout the several views, and wherein:

FIGS. 2, 3 and 4 are sketches corresponding to FIG. 1 of annular seals embodying the invention;

FIGS. 5a, 5b and 5c are sketches showing one way of engaging a reinforced bead on the annular seal in a mounting groove; and FIGS. 6a and 6b are sketches showing a different form of reinforced bead on the annular seal.

DETAILED DESCRIPTION OF THE PREFERRED EMBODIMENT

Figure 1:
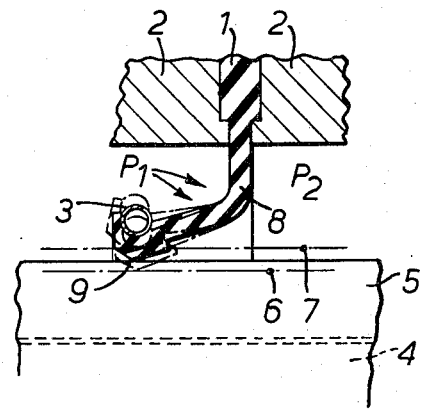
FIG. 1 is a sketch of a horizontal section through a part of a previously proposed annular shaft seal.

In the type of annular lip seal shown in FIG. 1, a marine propeller shaft 4 has a surrounding collar or sleeve 5 and rotates within a cylindrical mounting 2, which may be a part of the ship's hull.

In order to prevent flow of fluid along the annular space between the mounting and the shaft sleeve 5, an annular seal blocks that space, and that includes a radially outer thick rim 1 engaged in a groove in the mounting 2, a diaphragm part 8 extending radially inwardly, and then axially to a sharp lip 9 at its inner end which rubs on the shaft sleeve, as the shaft rotates to effect the seal. A coil spring 3 extending annularly around the part of the diaphragm opposite the lip 9 holds the lip against the shaft sleeve. The bend in the diaphragm is designed to be towards the area of higher pressure $P_1$ and away from the area of lower pressure $P_2$.

Difficulties with that type of seal can arise due to the shaft sleeve surface being apparently eccentric about the axis of rotation, the two limiting positions being indicated in FIG. 1 at 6 and 7. That apparent eccentricity can cause leakage of fluid through the seal if the seal cannot flex easily to accommodate it, but if flexure of the seal is too easy, then an excessive difference in pressure between $P_1$ and $P_2$ can deform the diaphragm part 8 of the seal, and that can have the effect of lifting the lip 9, or bringing the rear surface of the diaphragm into contact with the shaft sleeve 5, to cause substantially increased frictional losses during rotation.

Figure 2:
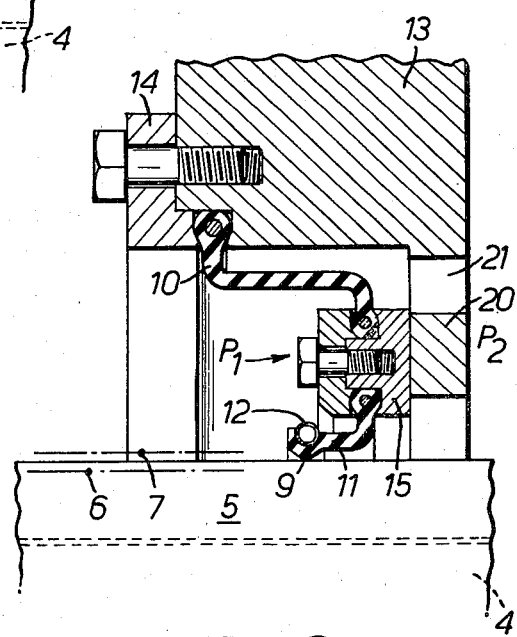

These disadvantages are overcome in accordance with the design of FIG. 2, which has essentially three components, namely a relatively rigid ring 15, and separate radially outer and radially inner elastomeric flanges 10 and 11.

The outer flange 10 has reinforced radially outer and radially inner beads engaged in respective grooves in the surrounding mounting 13, and in the rigid ring 15. The main part of the other flange 10 extends in a cylinder generally parallel with the axis of the shaft.

The inner elastomeric flange 11 is similarly supported at its radially outer edge from the ring 15, and it also extends generally parallel with the shaft axis, but for an axial length only about half that of the flange 10, and it has at its lower edge the conventional sealing lip 9 urged against the surface of the shaft sleeve 5 by a coil spring 12.

The mounting 13 has a radially inwardly extending flange or support 20 providing an axial locating surface for the ring 15, but the flange 20 is apertured at 21 so that the low pressure $P_2$ has access to the face of the outer flange 10.

The ring 15 is of metal or of a plastics material which is rigid relatively to the elastomeric material of the flanges 10 and 11, and so does not distort in response to substantial pressure differences between $P_1$ and $P_2$, and indeed it is axially located against the flange 20. It is however free to move radially due to flexure of the flanges 10 and 11 in the most favorable direction due to their principal lengths being parallel with the shaft axis.

Thus variations in the position of the surface of the sleeve 5, as shown at 6 and 7, are easily accommodated by flexing of the inner flange 11, and there is no tendancy to distort the seal so that the surface of the flange 11 leading to the lip 9 comes into contact with the surface of the sleeve 5.

The inner flange 11 conveniently includes wear resistant compounds which reduce the wear as sliding occurs between the lip and the sleeve at the expense of some loss in the flexibility of the material. A preferred wear resistant compound includes from 50% to 70% P.T.F.E. by volume, from 10% to 30% graphite by volume, and from 10% to 30% bronze by volume. This mixture may be in the form of a mixed powder present in a percentage of between 5% and 30% in a nitrite rubber or plastics or other elastomer stable in sea and fresh water and forming the body of the flange 11.

Figure 3:
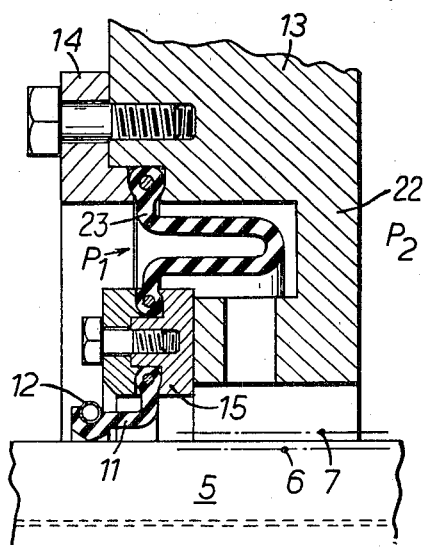

In the modification shown in FIG. 3 the outer flange 23 is of convoluted form with a first part extending axially in one direction and a second part extending axially in the other direction so that the two reinforced beads are radially in line with one another.

In the modification shown in FIG. 4, instead of having an external rigid ring 15 clamped to inner and outer elastomeric flanges 10 and 11, the two flanges are formed by a common annular diaphragm of elastomeric material, as indicated at 16 which is moulded around a relatively rigid plastics or metal reinforcing ring 17. It is possible in that embodiment for the wear resisting compound to be included only in the part of the elastomeric flange between the ring 17 and the lip 9.

FIGS. 5a, 5b and 5c show how any of the radially inner or outer edges of an elastomeric flange can be in the form of a bead moulded around an edge reinforcement shown in FIG. 5a as a circumferential metal wire 31 of circular cross section. That can easily be engaged in an annular groove defined between co-operating edges of the mounting 13, and an end flange 14 bolted to it as shown in FIGS. 2 and 3. The cross section of the groove includes a main part in the form of a rectangle with a neck leading to it by way of a pair of outwardly inclined sides, so that the walls of the groove press on the external surface of the bead 30 at the three points indicated at x in FIG. 5b namely at the two inclined sides and the opposite face of the rectangular portion. The neck has a width indicated at y in FIG. 5b approximately equal to (e.g. between 2½ and ⅜ times) the diameter of the wire reinforcement 31 so that once the end flange 14 has been bolted to the mounting 13, it is not possible to displace the flange rim from the mounting.

An alternative form of reinforcement shown in FIGS. 6a and 6b is of metal or plastics wire in the form of a helical coil 32 extending circumferentially around the edge of the flange 33 in order to permit some circumferential flexibility to enable the bead to be easily fitted in the groove while the bead is rather stronger than that shown in FIGS. 5a, 5b and 5c because of the continuous elastomeric material around the coils of the helix.

The flanges 20 and 22 of FIGS. 2 and 3 respectively, could be used also in the embodiment of FIG. 4, but it is not essential in all applications, and particularly in the moulded arrangement of FIG. 4.

In all embodiments the outer flange is more flexible than the inner flange, whether by choice of the material or by design of the lengths and thicknesses of the flanges. The inner flange only needs to flex enough to maintain the seat at 9, whereas relative movement between the shaft and the housing is accommodated by the outer flange.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An annular seal between a rotatable shaft sleeve and a surrounding housing to prevent the flow of fluid along said shaft sleeve comprising:
   a rigid ring movably disposed within said housing and surrounding said shaft sleeve such that said ring is movable relative to said shaft sleeve in a radial direction;
   first and second flexible flanges attached to said ring such that said first flexible flange is disposed between and connected to said housing and said ring wherein said first flexible flange further comprises a portion spaced radially from said housing and said ring;
   said second flexible flange being disposed between said ring and said shift sleeve and connected to said ring;
   a sealing contact lip operatively associated with said second flexible flange and forming a seal against said shaft sleeve, wherein said second flexible flange is disposed between said shaft sleeve and said ring and wherein said second flexible flange further comprises a portion spaced radially from said housing and said shaft sleeve and wherein said first and second flanges further comprise deformation means for variations of radial clearance between said housing and said shaft sleeve during rotation of said shaft sleeve such that said seal is maintained at said sealing contact lip.

2. A seal according to claim 1 wherein at least one of said first and second flanges extends with a substantial component parallel with the axis of said shaft sleeve.

3. A seal according to claim 2 wherein said second flange has greater radial flexibility than said first flange.

4. A seal according to claim 3 wherein said first flange is longer than said second flange.

5. A seal according to claim 4 further comprising a support on said housing for locating said ring in one axial direction.

6. A seal according to claim 5 wherein said housing forms an annular groove having a neck portion for accommodating said first flange therein, and wherein said first flange comprises a bead disposed at an edge portion thereof, and a reinforcement member disposed within said bead such that said reinforcement member has a width substantially the same as said neck portion of said annular groove.

7. A seal according to claim 6 wherein said first and second flanges comprise elastomeric material.

8. A seal according to claim 7 wherein said second flange comprises a wear resisting compound.

9. A seal according to claim 6 wherein said wear resisting compound comprises PTFE.

10. A seal according to claim 8 wherein said wear resisting compound comprises graphite.

11. A seal according to claim 8 wherein said wear resisting compound comprises bronze.

12. A seal according to claim 8 wherein said wear resisting compound comprises mixtures of PTFE, graphite and bronze.

13. A seal according to either claim 9, 10, 11 or 12 wherein said wear resisting compound comprises between 50% and 70% by volume of PTFE, between 10% and 30% by volume of graphite and between 10% and 30% by volume of bronze.

14. A seal according to either claim 1, 2, 3, 4, 5, 6, 7, 8, 9, 10, 11 or 12 wherein said first and second flanges comprise a single piece of elastomeric material moulded around said ring.

15. A seal according to either claim 1, 2, 3, 4, 5, 6, 7, 8, 9, 10, 11 or 12 wherein said ring is clamped to the radially inner edge of said first flange and to the radially outer edge of said second flange.

* * * * *